(12) United States Patent
Yin

(10) Patent No.: US 11,765,808 B1
(45) Date of Patent: Sep. 19, 2023

(54) WAKE-UP DESK LAMP

(71) Applicant: SHENZHEN FEIHE ELECTRONICS CO., LTD, Shenzhen (CN)

(72) Inventor: Wei Yin, Shenzhen (CN)

(73) Assignee: SHENZHEN FEIHE ELECTRONICS CO., LTD, Shenzhen (CN)

( * ) Notice: Subject to any disclaimer, the term of this patent is extended or adjusted under 35 U.S.C. 154(b) by 0 days.

(21) Appl. No.: 18/176,586

(22) Filed: Mar. 1, 2023

(30) Foreign Application Priority Data

Dec. 27, 2022 (CN) .......................... 202211687001.9

(51) Int. Cl.
*H05B 47/155* (2020.01)
*H05B 47/16* (2020.01)
*G06F 3/16* (2006.01)

(52) U.S. Cl.
CPC ........... *H05B 47/155* (2020.01); *H05B 47/16* (2020.01); *G06F 3/165* (2013.01)

(58) Field of Classification Search
None
See application file for complete search history.

(56) References Cited

U.S. PATENT DOCUMENTS

| | | | | |
|---|---|---|---|---|
| 11,510,298 | B1* | 11/2022 | Sterling | H05B 45/50 |
| 2017/0189640 | A1* | 7/2017 | Sadwick | H05B 45/20 |
| 2018/0077767 | A1* | 3/2018 | Soler | H05B 45/20 |
| 2018/0295696 | A1* | 10/2018 | Li | A61N 5/0618 |
| 2019/0380188 | A1* | 12/2019 | Hovers | H05B 47/115 |
| 2020/0371742 | A1* | 11/2020 | Deros | G06F 3/165 |
| 2021/0276480 | A1* | 9/2021 | Kim | B60Q 1/26 |
| 2022/0014041 | A1* | 1/2022 | Knode | H04W 72/20 |
| 2022/0366906 | A1* | 11/2022 | Wu | G10L 21/0216 |

\* cited by examiner

*Primary Examiner* — Wilson Lee
(74) *Attorney, Agent, or Firm* — Jeenam Park

(57) ABSTRACT

A wake-up desk lamp, comprises a main control unit which is respectively connected with and send control signals to a desk lamp control unit and a wake-up light control unit respectively; the desk lamp control unit is connected to the desk lamp drive unit, and the desk lamp control unit control the desk lamp drive unit according to the control signal to drive a desk lamp emitting module to turn on and off; the wake-up light control unit is connected to the wake-up light drive unit, the wake-up light control unit control the wake-up light drive unit according to the control signal to drive a wake-up light emitting module to turn on and off. The lamp has both lighting function and wake-up function, which saves the area occupied by the lamp and the power consumption, and the user purchases one product to have the effect of two products.

10 Claims, 2 Drawing Sheets

WAKE-UP DESK LAMP

CROSS-REFERENCE TO RELATED APPLICATIONS

This application claims priority to Chinese Patent Application No. 202211687001.9, filed on Dec. 27, 2022, the contents of which are herein incorporated by reference in their entireties.

TECHNICAL FIELD

The present disclosure relates to the technical filed of lighting control, and in particular to a wake-up desk lamp.

BACKGROUND

Existing desk lamps or wake-up lamps can only perform their own functions. For example, desk lamps can only perform lighting functions, and cannot simulate daylight to gently wake up a sleeping person. At the same time, the wake-up light can only perform its own timing wake-up function, and it is difficult to provide the same lighting function as desk lamps, and the usage scenarios of the two are highly overlapping, crowding out the user's private space, which is very unfriendly to the user experience. The operating logic and control methods of the lights are completely different.

SUMMARY

The present disclosure provides a wake-up desk lamp, comprising: a main control unit, a desk lamp control unit, a wake-up light control unit, a desk lamp drive unit, and a wake-up light drive unit;

the main control unit is respectively connected with the desk lamp control unit and the wake-up light control unit, and is configured to send control signals to the desk lamp control unit and the wake-up light control unit respectively;

the desk lamp control unit is connected to the desk lamp drive unit, and the desk lamp control unit is configured to control the desk lamp drive unit according to the control signal to drive a desk lamp emitting module to turn on and off;

the wake-up light control unit is connected to the wake-up light drive unit, the wake-up light control unit is configured to control the wake-up light drive unit according to the control signal to drive a wake-up light emitting module to turn on and off.

Further, the wake-up desk lamp also comprises a power supply isolation circuit;

the power supply isolation circuit is connected to the wake-up light emitting module, and is configured to isolate an interference signal between the wake-up light emitting module and the main control unit.

Further, the power supply isolation circuit comprises: a common mode coil, and the common mode coil comprises a first end, a second end, a third end and a fourth end;

the first end and the second end are configured to connect with the main control unit, and the third end and the fourth end are configured to connect with the wake-up light emitting module.

Further, a first capacitor is connected between the first end and the second end, and a second capacitor is connected between the third end and the fourth end.

Further, the wake-up desk lamp also comprises an external connection module and an over-voltage protection circuit;

the external connection module is configured to connect with external equipment to supply power for the external equipment, and the over-voltage protection circuit is connected with the external connection module for preventing current overload.

Further, the over-voltage protection circuit comprises: a Zener diode, a PNP transistor, an NMOS transistor, a first resistor, a second resistor, a third resistor, and a fourth resistor;

a negative pole of the Zener diode is connected to a base of the PNP transistor by the first resistor, the negative pole is also connected to the power supply by the fourth resistor, and a positive pole of the Zener diode is connected to a collector of the PNP transistor by the second resistor.

the source of the NMOS transistor is connected to the external connection module, and the drain of the NMOS transistor is connected to the power supply;

the emitter of the PNP transistor is connected to the drain of the NMOS transistor, and the collector of the PNP transistor is connected to the gate of the NMOS transistor by the third resistor.

Further, the wake-up desk lamp also comprises a clock unit, the clock unit is connected to the main control unit, and is configured to time and send a clock signal to the main control unit;

when the main control unit receives the clock signal, it sends a corresponding control signal to at least one of the desk lamp driving unit or the wake-up lamp driving unit according to a corresponding program setting.

Further, the wake-up desk lamp also comprises a touch control unit;

the touch control unit is connected to the desk lamp control unit and the wake-up lamp control unit for receiving touch control signals and sending the touch control signals to at least one of the desk lamp control unit or the wake-up lamp control unit;

the desk lamp control unit is configured to receive the touch control signal and send a corresponding control command to the desk lamp drive unit;

the wake-up light control unit is configured to receive the touch control signal and send a corresponding control command to the wake-up light drive unit.

Further, the wake-up desk lamp also comprises a backlight drive unit, a backlight interface and a backlight unit;

the backlight driving unit is connected to the main control unit, and the backlight unit is connected to the backlight driving unit by the backlight interface;

the backlight driving unit is configured to control the backlight unit to turn on and off by the backlight interface according to the control signal of the main control unit.

Further, the wake-up desk lamp also comprises voice control unit and audio unit;

the audio unit and the voice control unit are respectively connected to the main control unit;

the voice control unit is configured to receive a voice signal, and send the voice signal to the main control unit for analysis;

the audio unit is configured to receive a control signal from the main control unit, and control the speaker to emit sound according to the control signal.

The present disclosure relates to the technical filed of lighting control, discloses a wake-up desk lamp, comprising: a main control unit, a desk lamp control unit, a wake-up light control unit, a desk lamp drive unit, and a wake-up light drive unit; the main control unit is respectively connected with the desk lamp control unit and the wake-up light control unit, and is configured to send control signals to the desk lamp control unit and the wake-up light control unit respectively; the desk lamp control unit is connected to the desk lamp drive unit, and the desk lamp control unit is configured to control the desk lamp drive unit according to the control signal to drive a desk lamp emitting module to turn on and off; the wake-up light control unit is connected to the wake-up light drive unit, the wake-up light control unit is configured to control the wake-up light drive unit according to the control signal to drive a wake-up light emitting module to turn on and off. The lamp has both the lighting function of the table lamp and the wake-up function of the wake-up lamp, which saves the area occupied by the lamp and the power consumption, and the user purchases one product to have the effect of two products.

BRIEF DESCRIPTION OF THE DRAWINGS

In order to illustrate the technical solution of the present disclosure more clearly, the following drawings will be briefly introduced in the embodiments. It should be understood that the following drawings only show some embodiments of the present disclosure, and therefore should not be regarded as limiting the protection scope of the present disclosure. In the respective drawings, similar components are given similar reference numerals.

DETAILED DESCRIPTION

The following will clearly and completely describe the technical solutions in the embodiments of the present disclosure with reference to the accompanying drawings in the embodiments of the present disclosure. Obviously, the described embodiments are only some, not all, embodiments of the present disclosure.

The components of the embodiments of the disclosure generally described and illustrated in the figures herein may be arranged and designed in a variety of different configurations. Accordingly, the following detailed description of the embodiments of the disclosure provided in the accompanying drawings is not intended to limit the scope of the claimed disclosure, but merely represents selected embodiments of the disclosure. Based on the embodiments of the present disclosure, all other embodiments obtained by those skilled in the art without making creative efforts belong to the protection scope of the present disclosure.

Hereinafter, the terms "comprising", "including" and their cognates that may be used in various embodiments of the present disclosure are only intended to represent specific features, numbers, steps, operations, elements, components or combinations of the foregoing, and it should not be understood as first excluding the existence of one or more other features, numbers, steps, operations, elements, components or combinations of the foregoing or adding one or more features, numbers, steps, operations, elements, components or a combination of the foregoing possibilities.

In addition, the terms "first", "second", "third", etc. are only used for distinguishing descriptions, and should not be construed as indicating or implying relative importance.

Unless defined otherwise, all terms (including technical terms and scientific terms) used herein have the same meaning as commonly understood by one of ordinary skill in the art to which various embodiments of the present disclosure belong. The terms (such as those defined in commonly used dictionaries) will be interpreted as having the same meaning as the contextual meaning in the relevant technical field and will not be interpreted as having an idealized meaning or an overly formal meaning, Unless clearly defined in various embodiments of the present disclosure.

The wake-up desk lamp provided by this disclosure is a new type of lamp formed by combining the wake-up lamp and the desk lamp into one. A main control unit is respectively connected to the desk lamp control unit and the wake-up lamp control unit to drive the desk lamp drive unit and the wake-up lamp drive unit, so as to realize the control of desk lamp and wake-up lamp. Allows users to control lights and wake up lights on one fixture.

Next, the wake-up desk lamp of the present disclosure is described with specific embodiments.

Figure 1:
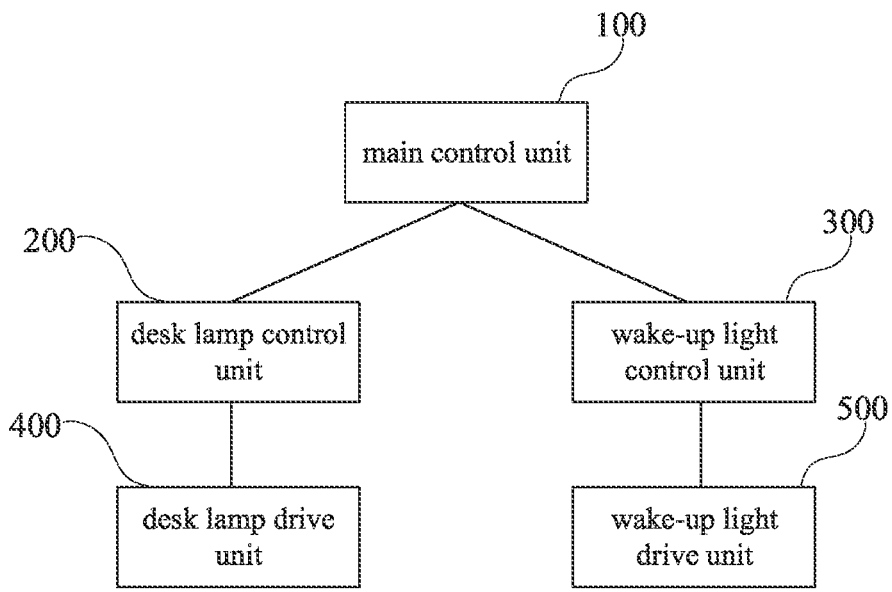
FIG. 1 is a hardware structure schematic diagram of a wake-up desk lamp according to an embodiment of the present disclosure.

As shown in FIG. 1, the wake-up desk lamp of the present disclosure comprises a main control unit 100, a desk lamp control unit 200, a wake-up light control unit 300, a desk lamp drive unit 400 and a wake-up light drive unit 500.

Wherein the main control unit 100 is respectively connected with the desk lamp control unit 200 and the wake-up light control unit 300 for sending control signals to the desk lamp control unit 200 and the wake-up light control unit 300 respectively.

The above-mentioned main control unit 100 can be an IC (Integrated Circuit Chip, chip) circuit for sending and receiving signals and performing information processing. The main control unit can perform some complex calculations and realize some control functions, such as timing control, wake-up light mode control, etc.

The desk lamp control unit 200 is connected to the desk lamp drive unit 400, and the desk lamp control unit 200 is configured to control the desk lamp drive unit 400 according to the control signal to drive a desk lamp emitting module to turn on and off.

The desk lamp control unit 200 is a control unit specially used for lighting the desk lamp emitting module. There is an IC circuit specially used for managing the desk lamp inside. After receiving the control signal from the main control unit 100, it will process the signal and convert it into the corresponding control signal sending to the table lamp driving unit 400.

The wake-up light control unit 300 is connected to the wake-up light drive unit 500, the wake-up light control unit 300 is configured to control the wake-up light drive unit 500 according to the control signal to drive a wake-up light emitting module to turn on and off.

The wake-up light control unit 300 is a control unit specially used to control the flashing of the wake-up light emitting module. Different from desk lamps, the wake-up light has multiple light-emitting modes, and in order to have a wake-up function, a timing function is also required, so the wake-up light control unit 300 is configured with an IC circuit dedicated to controlling the wake-up light. When receiving a control signal from the control unit 100, it will process the signal and convert it into a corresponding control signal and send it to the wake-up light driving unit 500.

It can be understood that the IC in the main control unit is arranged with special pins, the pins of the console light are connected to the desk lamp control unit 200, and the pins for controlling the wake-up light are connected to the wake-up light control unit 300, thus realizing the control of the desk lamp. Separate control or joint control of parts or wake-up light parts.

According to the above structure, the desk lamp and the wake-up lamp can be combined into one, so that one lamp can realize the wake-up function of the wake-up lamp and the lighting function of the desk lamp at the same time.

Figure 2:
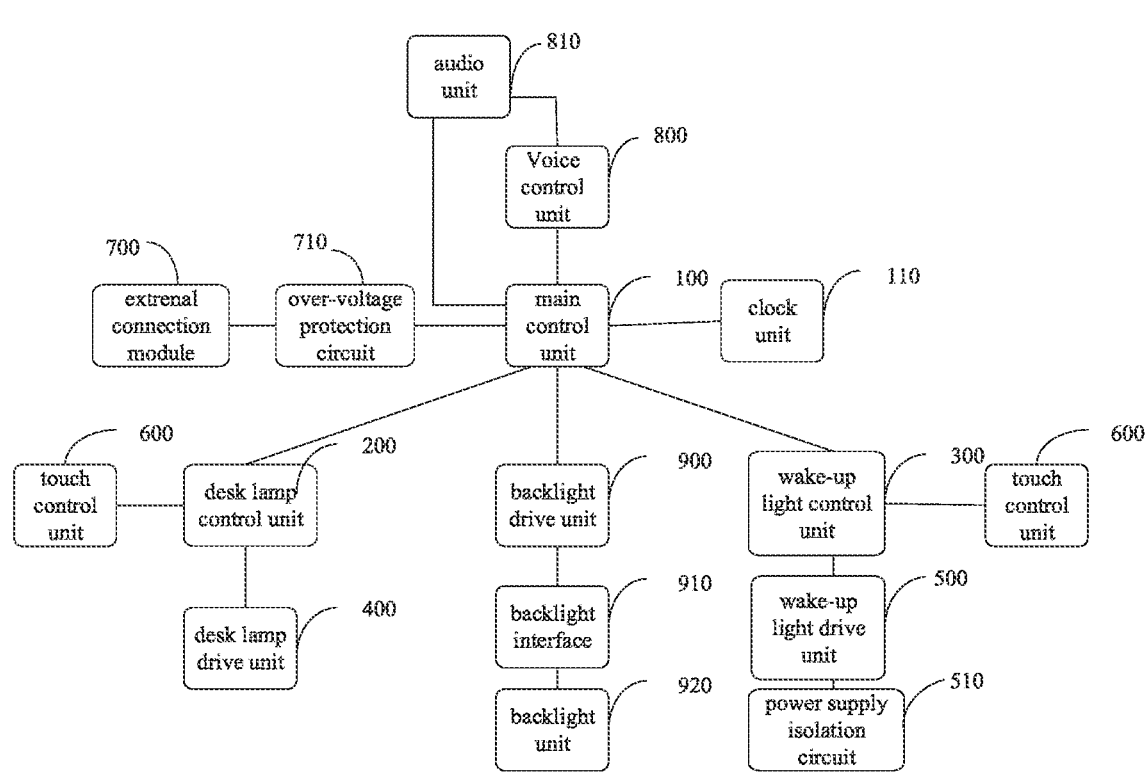
FIG. 2 is a hardware structure schematic diagram of a wake-up desk lamp according to another embodiment of the present disclosure.

In addition, the wake-up desk lamp of the present disclosure may also comprises various functional modules. As shown in FIG. 2, the wake-up desk lamp comprises a touch control unit 600, a power supply isolation circuit 510, an external connection module 700, and an over-voltage protection circuit 710, a clock unit 110, a voice control unit 800, an audio unit 810, a backlight drive unit 900, a backlight interface 910 and a backlight unit 920.

The touch control unit 600 can be understood as a touch panel, and a variety of keys are provided in the touch control unit 600 for users to use, such as timing keys, opening keys, closing keys, adjusting keys, and so on. The touch control unit 600 is connected to the desk lamp control unit 200 and the wake-up light control unit 300, so that the touch control signal triggered by the user on the touch control unit 600 can be directly sent to the corresponding control unit, and these control units are sent to the corresponding drive unit, to directly control the part of the desk lamp or the wake-up lamp manually. For the wake-up light, the touch control unit 600 also provides a button for switching the blinking mode of the wake-up light, so that the user can manually switch the blinking mode of the wake-up light.

In addition, the wake-up desk lamp of the present disclosure also provides a variety of control modes, such as a timing lighting function. The user can set the corresponding timing through the buttons on the touch control unit 600, such as setting to turn on the desk lamp at 6 o'clock in the evening to provide lighting, or turn on the wake-up light and desk lamp at 6 o'clock at the same time to remind users that they need to study and work at that point, all of which can be realized through the buttons provided in the touch control unit. The control signals sent by the touch control unit 600 are directly sent to the corresponding desk lamp control unit 200 or the wake-up lamp control unit 300, and then these control signals are distributed to the corresponding drive unit or main control unit 100 according to their types. For example, direct instructions such as switching or adjusting brightness can be directly sent to the corresponding drive unit, and if settings such as delay settings are performed, they will be sent to the main control unit 100.

Because this disclosure combines two modules of desk lamp and wake-up lamp, in the whole circuit, the circuits of the two modules will work in different control logics, and different control signals will be transmitted in the lines, so there will be mutual existence Jamming signal. For the desk lamp part used for lighting, its function is single, and for the wake-up lamp, because it has a variety of flashing modes, it is necessary to avoid being disturbed by the desk lamp. For this, as shown in FIG. 2, a power supply isolation circuit 510 is set up between the lamp driving single turn 500 and the main control unit 100 to eliminate interference.

Figure 3:
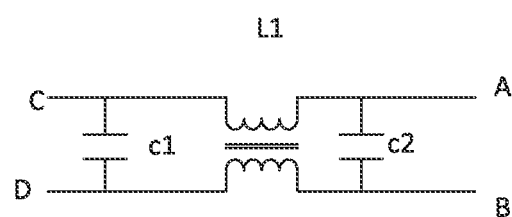
FIG. 3 is a schematic diagram of a power supply isolation circuit according to an embodiment of the present disclosure.

Specifically, as shown in FIG. 3, the power supply isolation circuit 510 comprises a common mode coil L1, a first capacitor C1 and a second capacitor C2.

Wherein, the common mode coil L1 is formed by a magnetic core and two wires surrounding it, thus the common mode coil L1 has 4 ports, wherein two sets of wires are AC and BD, and two coils are formed around them. The AB terminal can be connected to the side where the main control unit 100 is located, and the CD terminal can be connected to the side of the wake-up light emitting module. Therefore, in this short circuit, the current can flow in the order of ACDB, so it can be seen that when the power is turned on, both the direction of the magnetic flux generated on the two coils is the same, the magnetic flux becomes larger and the inductance increases, thereby preventing mutual interference.

The external connection module 700 is an interface that is connected to the main control unit 100 by the over-voltage protection circuit 710 and can be connected to external devices. The external connection module 700 can be interfaces such as USB interfaces and Type-C interfaces, and these interfaces can be used the charging device is charged through this interface, and in this embodiment the wake-up desk lamp is charged. To a certain extent, a power socket occupied by the wake-up desk lamp is returned.

Figure 4:
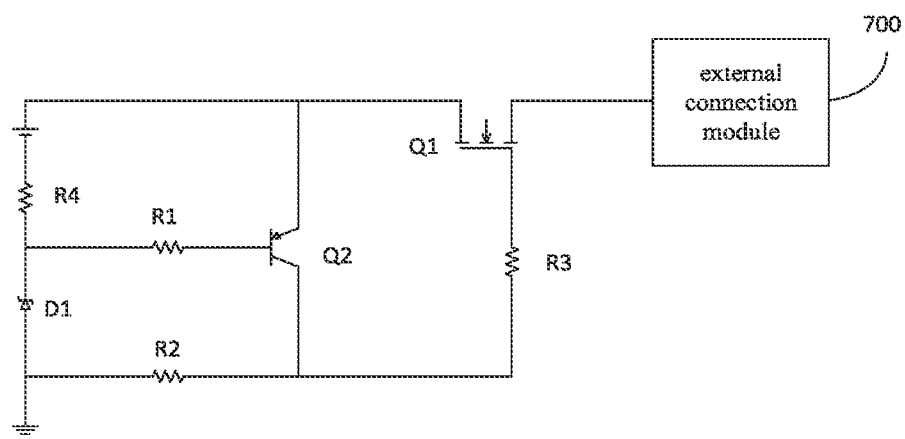
FIG. 4 is a schematic diagram of an over-voltage protection circuit according to an embodiment of the present disclosure.

The over-voltage protection circuit 710 is a protection circuit set to prevent excessive current output to external devices, as shown in FIG. 4.

The over-voltage protection circuit 710 comprises: a Zener diode D1, a PNP transistor Q2, an NMOS transistor Q1, a first resistor R1, a second resistor R2, a third resistor R3, and a fourth resistor R4;

A negative pole of the Zener diode D1 is connected to a base of the PNP transistor Q2 by the first resistor R1, the negative pole is also connected to the power supply by the fourth resistor R4, and a positive pole of the Zener diode D1 is connected to a collector of the PNP transistor Q2 by the second resistor R2.

The source of the NMOS transistor Q1 is connected to the external connection module 700, and the drain of the NMOS transistor Q1 is connected to the power supply.

The emitter of the PNP transistor Q2 is connected to the drain of the NMOS transistor Q1, and the collector of the PNP transistor Q2 is connected to the gate of the NMOS transistor Q1 by the third resistor R3.

When working with power on, if the voltage from the power supply is in a normal range, the Zener diode D1 will not be broken down, so the current flowing through the fourth resistor R4 is basically zero. The Vbe=0 of the PNP transistor Q2 is in the cut-off state, and the Vgs of the NMOS transistor Q1 is determined by the voltage division between the second resistor R2 and the PNP transistor Q2, and because Q2 is in the cut-off state, the voltage of the gate of Q1 is 0, so the NMOS transistor is turned on, and the current output to the external connection module 700 is normally turned on.

And when the voltage from the power supply is too large, the Zener diode D1 is broken down, and the collector voltage of the PNP transistor Q2 is the smallest, the emitter voltage is the largest, and it is in a conducting state, so that the gate voltage of the NMOS transistor is approximately equal to the input power itself, the voltage is greater than the specified preset voltage, the NMOS tube will be in the off state, and the resistance current will output.

It can be understood that the above-mentioned excessive voltage or normal setting is set according to the device that the external connection module 700 will be connected to. For example, for mobile terminals such as mobile phones, the normal charging voltage is about 5V. When the voltage at the power source is greater than 5V, it means that the voltage is too large, which may damage the equipment.

Therefore, when it is below 5V, the current can be allowed to conduct, but when it is above 5V, the current is not allowed to conduct. In order to meet the above-mentioned control requirements, the parameters of the above-mentioned electronic components such as Zener diodes, PNP transistors, and NMOS transistors need to be selectively configured according to the normal voltage setting. Specific types, signals and parameters of each electronic component are not limited in this disclosure.

Moreover, the circuit will not fail due to excessive primary current. When the current recovers, it can be used again, ensuring the stability of the circuit.

The above-mentioned clock unit 110 is used for timing, and the timing result is sent to the main control unit 100 in real time through the clock signal. The main control unit 100 determines the current time or performs timing through the clock signal. At the same time, the clock unit 110 can also be used to realize the timing wake-up function of the wake-up light.

The above-mentioned audio unit 810 and the voice control unit 800 are respectively connected with the main control unit 100.

Wherein, the voice control unit 800 is used for receiving voice signals, and sending the voice signals to the main control unit for analysis. These voice signals can be pre-set keywords, such as turning on the light, turning off, etc. After receiving these voice signals, the main control unit 100 can analyze the corresponding control signals and reset other functional units to work.

The audio unit 810 is used for receiving a control signal from the main control unit, and controlling the speaker to emit sound according to the control signal.

For example, the user is currently taking a nap and needs to get up at 6 o'clock in the evening. In order to ensure the indoor lighting after getting up, an alarm at 6 o'clock is set by the touch unit 600, and the desk lamp is required to be woken up to light up the desk lamp light-emitting module and wake-up light lighting module at the same time after one hour. Then after setting, the clock unit 110 will start counting down, and when it reaches 6 o'clock, it will send a clock signal to the main control unit 100 to tell the main control unit 100 to flash the console light and the wake-up light according to the set content. The main control signal sends corresponding control signals to the desk lamp control unit 200 and the wake-up lamp control unit 300 by the corresponding pins, finally triggering the desk lamp and the wake-up lamp simultaneously, and also controlling the audio unit 810 to start playing the alarm.

It can be understood that the flashing time of the desk lamp and the wake-up lamp can also be set separately, for example, the desk lamp is turned on 10 minutes late, so that the user has 1 minute of wake-up time.

The backlight driving unit 900 is connected to the main control unit 100, and the backlight unit 920 is connected to the backlight driving unit 900 through the backlight interface 910.

The backlight driving unit 900 is used to control the backlight unit 920 to turn on and off by the backlight interface 910 according to the control signal of the main control unit 100. It can be understood that the backlight of the backlight unit 920 is combined with the touch unit 600 to form a touch panel, and the backlight unit 920 emits light to make the keys on the touch unit 900 light up, so that the user can clearly see the function names of the touch keys.

The wake-up desk lamp of this disclosure has the functions of desk lamp and wake-up lamp at the same time. For the signal interference caused by the fusion of the two control systems, a power supply isolation circuit is set up to ensure that the wake-up lamp will not flashes abnormally by the control signal of the desk lamp. In addition, the wake-up desk lamp of the present disclosure is also provided with an external connection module, which is used to supply power to other external devices, and has the function of returning the socket occupied by the wake-up desk lamp, and an overvoltage protection circuit is provided for the external power supply device to prevent damage of burning out equipment due to overcurrent, making the use of this wake-up desk lamp safer and more reliable. And by combining the functions of the desk lamp and the wake-up light into one, the user can have the wake-up function of the wake-up light and the wake-up function of the desk lamp at the same time after purchasing one product, and the desk lamp can also be operated by the timing switch of the wake-up light. When the user wakes up in a dark room, sufficient lighting can also be provided by the desk lamp.

In the several embodiments provided in this disclosure, it should be understood that the disclosed devices and methods may also be implemented in other ways. The device embodiments described above are only illustrative. For example, the flowcharts and structural diagrams in the accompanying drawings show the possible implementation architecture, functions and operation of devices, methods and computer program products according to multiple embodiments of the present disclosure. In this regard, each block in a flowchart or block diagram may represent a module, program segment, or part of code that includes one or more executable instructions. It should also be noted that, in alternative implementations, the functions noted in the block may occur out of the order noted in the figures. For example, two blocks in succession may, in fact, be executed substantially concurrently, or they may sometimes be executed in the reverse order, depending upon the functionality involved. It is also to be noted that each block of the block diagrams and/or flow diagrams, and combinations of blocks in the block diagrams and/or flow diagrams, can be implemented by a dedicated hardware-based system that performs the specified function or action may be implemented, or may be implemented by a combination of special purpose hardware and computer instructions.

In addition, each functional module or unit in each embodiment of the present disclosure can be integrated together to form an independent part, or each module can exist independently, or two or more modules can be integrated to form an independent part.

If the functions are implemented in the form of software function modules and sold or used as independent products, they can be stored in a computer-readable storage medium. Based on this understanding, the essence of the technical solution of the present disclosure or the part that contributes to the prior art or the part of the technical solution can be embodied in the form of a software product, and the computer software product is stored in a storage medium, including several instructions are used to make a computer device (which may be a smart phone, a personal computer, a server, or a network device, etc.) execute all or part of the steps of the methods described in various embodiments of the present disclosure. The aforementioned storage media include: U disk, mobile hard disk, read-only memory (ROM, Read-Only Memory), random access memory (RAM, Random Access Memory), magnetic disk or optical disk, and other media that can store program codes.

The above is only a specific embodiment of the present disclosure, but the scope of protection of the present disclosure is not limited thereto. Anyone skilled in the art can easily think of changes or substitutions within the technical scope disclosed in the present disclosure. Should be covered within the protection scope of the present disclosure.

What is claimed is:

1. A wake-up desk lamp, comprising: a main control unit, a desk lamp control unit, a wake-up light control unit, a desk lamp drive unit, and a wake-up light drive unit;
   the main control unit is respectively connected with the desk lamp control unit and the wake-up light control unit, and is configured to send control signals to the desk lamp control unit and the wake-up light control unit respectively;
   the desk lamp control unit is connected to the desk lamp drive unit, and the desk lamp control unit is configured to control the desk lamp drive unit according to the control signal to drive a desk lamp emitting module to turn on and off;
   the wake-up light control unit is connected to the wake-up light drive unit, the wake-up light control unit is configured to control the wake-up light drive unit according to the control signal to drive a wake-up light emitting module to turn on and off.

2. The wake-up desk lamp according to claim 1, wherein also comprises a power supply isolation circuit;
   the power supply isolation circuit is connected to the wake-up light emitting module, and is configured to isolate an interference signal between the wake-up light emitting module and the main control unit.

3. The wake-up desk lamp according to claim 2, wherein the power supply isolation circuit comprises: a common mode coil, and the common mode coil comprises a first end, a second end, a third end and a fourth end;
   the first end and the second end are configured to connect with the main control unit, and the third end and the fourth end are configured to connect with the wake-up light emitting module.

4. The wake-up desk lamp according to claim 3, wherein a first capacitor is connected between the first end and the second end, and a second capacitor is connected between the third end and the fourth end.

5. The wake-up desk lamp according to claim 1, wherein also comprises an external connection module and an over-voltage protection circuit;
   the external connection module is configured to connect with external equipment to supply power for the external equipment, and the over-voltage protection circuit is connected with the external connection module for preventing current overload.

6. The wake-up desk lamp according to claim 5, wherein the over-voltage protection circuit comprises: a Zener diode, a PNP transistor, an NMOS transistor, a first resistor, a second resistor, a third resistor, and a fourth resistor;
   a negative pole of the Zener diode is connected to a base of the PNP transistor by the first resistor, the negative pole is also connected to the power supply by the fourth resistor, and a positive pole of the Zener diode is connected to a collector of the PNP transistor by the second resistor;
   the source of the NMOS transistor is connected to the external connection module, and the drain of the NMOS transistor is connected to the power supply;
   the emitter of the PNP transistor is connected to the drain of the NMOS transistor, and the collector of the PNP transistor is connected to the gate of the NMOS transistor by the third resistor.

7. The wake-up desk lamp according to claim 1, wherein also comprises a clock unit, the clock unit is connected to the main control unit, and is configured to time and send a clock signal to the main control unit;
   when the main control unit receives the clock signal, it sends a corresponding control signal to at least one of the desk lamp driving unit or the wake-up lamp driving unit according to a corresponding program setting.

8. The wake-up desk lamp according to claim 1, wherein also comprises a touch control unit;
   the touch control unit is connected to the desk lamp control unit and the wake-up lamp control unit for receiving touch control signals and sending the touch control signals to at least one of the desk lamp control unit or the wake-up lamp control unit;
   the desk lamp control unit is configured to receive the touch control signal and send a corresponding control command to the desk lamp drive unit;
   the wake-up light control unit is configured to receive the touch control signal and send a corresponding control command to the wake-up light drive unit.

9. The wake-up desk lamp according to claim 1, wherein also comprises a backlight drive unit, a backlight interface and a backlight unit;
   the backlight driving unit is connected to the main control unit, and the backlight unit is connected to the backlight driving unit by the backlight interface;
   the backlight driving unit is configured to control the backlight unit to turn on and off by the backlight interface according to the control signal of the main control unit.

10. The wake-up desk lamp according to claim 1, wherein also comprises voice control unit and audio unit;
    the audio unit and the voice control unit are respectively connected to the main control unit;
    the voice control unit is configured to receive a voice signal, and send the voice signal to the main control unit for analysis;
    the audio unit is configured to receive a control signal from the main control unit, and control the speaker to emit sound according to the control signal.

* * * * *